United States Patent [19]

Schols et al.

[11] Patent Number: 4,619,953

[45] Date of Patent: Oct. 28, 1986

[54] LOW STYRENE EMISSION VINYL ESTER RESIN EMPLOYING POLYACRYLATES FOR FIBER-REINFORCED APPLICATIONS

[75] Inventors: John A. Schols; Kee C. Yu, both of Sarnia, Canada

[73] Assignee: The Dow Chemical Company, Midland, Mich.

[21] Appl. No.: 773,499

[22] Filed: Sep. 9, 1985

[51] Int. Cl.$^4$ ................................................ C08K 5/00
[52] U.S. Cl. .................................... 523/465; 524/487; 524/489; 525/112
[58] Field of Search ................ 523/465; 525/112; 524/487, 489

[56] References Cited

U.S. PATENT DOCUMENTS 3,674,893  7/1972  Nowak et al. ...................... 525/112
4,546,142 10/1985  Walewski ............................ 524/487

FOREIGN PATENT DOCUMENTS 58-204057 11/1983  Japan .................................. 524/487

Primary Examiner—Lewis T. Jacobs

[57] ABSTRACT

Low styrene emission vinyl ester resin compositions containing a polyacrylate as an adhesion promoter. Said VER composition exhibits desirable physical properties such as low styrene emission and excellent adhesive bond strength.

12 Claims, No Drawings

LOW STYRENE EMISSION VINYL ESTER RESIN EMPLOYING POLYACRYLATES FOR FIBER-REINFORCED APPLICATIONS

BACKGROUND OF THE INVENTION

This invention relates to an improved novel low styrene emission vinyl ester resin formulation which exhibits desirable adhesion characteristics in fiber-reinforced applications.

Vinyl ester resins (hereinafter VER) are useful in corrosion resistant applications such as pipes, vessels, scrubbers and smoke stacks. Also, VER are utilized in the fabrication of glass fiber-reinforced products. The VER are admixed with styrene as a reactive diluent to reduce the viscosity of the VER. The presence of styrene in the VER composition results in the emission of styrene vapors into the work atmosphere. Due to the increased attention given to styrene from the industrial hygiene point of view, several methods of reducing the styrene emission have been described in the art. One such method, described in Nylander, U.S. Pat. No. 4,201,826, includes the addition to the unsaturated polyester/styrene composition of a film-forming additive such as paraffin wax to inhibit the vaporization of the styrene.

Although the paraffin wax provides a desirable decrease in styrene vapor emission, it has been found that the paraffin wax additive results in a substantial loss in the adhesive properties of the VER to the reinforcing medium.

Therefore, it would be desirable to provide a low styrene emission VER composition which exhibits adhesion properties comparable to or improved over a VER composition without the paraffin wax additive.

SUMMARY OF THE INVENTION

The present invention stems from the discovery of the benefits of a polyacrylate as an adhesion promoter in a VER composition wherein the styrene emission has been inhibited by the presence of wax-like materials in the VER composition. Such wax is preferably a paraffin-type wax. The VER composition is improved by the addition of an adhesion promoter in the form of a polyacrylate.

A particular VER composition used in the present invention is one comprising: (1) a VER; (2) styrene as a reactive diluent; (3) wax as a styrene emission inhibitor; and (4) a polyacrylate as an adhesion promoter. Such polyacrylates are preferably alkyl esters of acrylic acid or copolymers thereof having the general formula

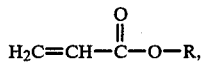

wherein R is a $C_1$ to $C_{16}$ hydrocarbon having a linear alkyl or branched alkyl chain. Such alkyl ester of acrylic acid is preferably polybutylacrylate or a copolymer of polyethylacrylate and polyethylhexylacrylate. The polyacrylate is present in amounts sufficient to increase the adhesion characteristic of the VER composition (without the polyacrylate) with the reinforcing material.

The improved adhesion characteristic of the present invention will provide a desirable low styrene emission VER composition which is capable of utilization in the fabrication of a range of fiber reinforced plastic structures and equipment.

DETAILED DESCRIPTION OF THE INVENTION

The present invention relates to an improved, low styrene emission, VER composition containing: (1) a VER; (2) styrene as a reactive diluent; (3) a wax as a styrene emission inhibitor; and (4) a polyacrylate as an adhesion promoter for fiber-reinforced applications. The improvement comprises a VER composition including a polyacrylate. The said polyacrylate is present in an amount sufficient to increase the adhesion characteristic of the VER composition (without the polyacrylate) with the reinforcing material.

For the purpose of this invention, unless otherwise distinguished, the term "VER composition" means a composition comprising a VER, a reactive diluent, a styrene emission inhibitor and a polyacrylate as an adhesion promoter.

The VER herein may be an esterification product of a polyepoxide and a monounsaturated monocarboxylic acid. An early patent, U.S. Pat. No. 3,179,623, describes the above reactions and resins. Further details about the resins and conditions and methods of making them can be found in the following U.S. Pat. Nos. 3,301,743; 3,317,465; 3,377,406; 3,256,226 and 3,367,992. All the above patents are incorporated herein by reference. An example of the said VER includes that VER sold by The Dow Chemical Company under the tradename Derakane ®.

During the fabrication of various end products from a VER it is desirable to reduce the viscosity of the VER in order to facilitate the processing. A reactive diluent is utilized to reduce the viscosity of the VER. Generally, the reactive diluent is present in amounts ranging from about 25 to about 55 weight percent of the VER composition depending on the monomer selected, other additives employed and other factors. Typical reactive diluents include styrene, vinyl toluene, halogenated styrenes, alkyl substituted styrenes, acrylic and methacrylic esters, hydroxyalkyl esters of acrylic and methylacrylic acid, and the like. Most preferably, the reactive diluent is styrene.

The physical properties of the VER composition comprising a VER and a reactive diluent may be modified by adding various materials to the resin. For example, insert reinforcing materials such as glass fibers and inert fillers such as calcium carbonate or kaolin clay are both commonly employed to improve physical properties of the VER composition and reduce costs.

The volatility of the reactive diluent, such as styrene, results in the emission of styrene vapor from the VER composition. The present composition employs a film-forming additive, i.e., a paraffin-type-wax, for example ceresin wax, to inhibit the emission of styrene into the work atmosphere. The film-forming additive may also be paraffin wax, however, ceresin is preferred due to its higher efficiency to minimize styrene evaporation. The ceresin wax is preferably utilized in amounts ranging from about 0.05 to about 5 weight percent of the said VER composition; most preferably, in amounts ranging from about 0.25 to about 0.5 weight percent of the VER composition.

The utilization of a wax as a film-forming inhibitor results in effective inhibition of styrene emission. However, a drawback of the use of the wax in the fiber-reinforced VER compositions is the undesirable loss of adhesion bond strength between the fiber fillers and the VER composition. Such adhesion bond strength is qualitatively measured by examining the amount of fibers present in the break pattern of a VER laminate that has been separated. In other words, the more fibers present in the break surface, the better the adhesive bond strength of the VER composition. Where the break surface is clean, i.e., very few glass fibers, the adhesive bond strength is poor.

It has been found that the utilization of a polyacrylate results in a low styrene emission VER composition which exhibits desirable adhesive bond strength to the glass fibers. The polyacrylates are preferably alkyl esters of acrylic acid or copolymers thereof having the general formula

wherein R is a $C_1$ to $C_{16}$ hydrocarbon having a linear alkyl or branched alkyl chain. The R group is preferably a $C_4$ to $C_8$ hydrocarbon having a linear alkyl or branched alkyl chain. Preferred alkyl esters of acrylic acid are polybutylacrylate and polyethylhexylacrylate. An example of a polybutylacrylate is sold by BASF under the tradename Acronal ®4F. Modaflow ®MF is an example of a copolymer of polyethylacrylate and polyethylhexylacrylate sold by Monsanto Chemical Company.

It is preferable to have the said polyacrylate present in an amount sufficient to increase the adhesion characteristic of a VER composition with a reinforcing material used therewith. More preferably, in an amount ranging from about 0.1 to about 5 weight percent of the VER composition and most preferably in an amount ranging from about 0.25 to about 1 weight percent of the VER composition. The VER composition of this invention shows improved adhesion bond strength as compared to the low styrene emission VER base which does not contain a polyacrylate as an adhesion promoter. Such VER compositions are useful in fabricating a range of fiber-reinforced plastic structures and equipment by all fabricating methods.

The following examples are provided to illustrate the invention but is not intended to limit the scope thereof. All parts are percentages by weight unless otherwise indicated.

EXAMPLE 1

A multilayer laminate is prepared from Derakane ®411-45 using the following composition:

| Component | Weight Percent |
|---|---|
| Derakane ® 411-45 | 95.00 |
| Cerasin Wax | 0.10 |
| Acronal 4F* | 0.50 |
| Styrene | 4.40 |

*A polybutylacrylate sold by BASF.

Derakane ®411-45 is a vinyl ester resin sold by The Dow Chemical Company. The resin is prepared by first blending a diglycidyl ether of bisphenol A having an epoxy equivalent weight of 188 and a diglycidyl ether of bisphenol A having an epoxy equivalent weight of 535. Added to this reaction product are glacial methacrylic acid, tris(dimethylaminomethyl)phenol and hydroquinone. Then maleic anhydride was added and reacted until the carboxylic acid content was 1 percent. Then parts of styrene containing 50 parts per million tertiary butyl catechol was added and mixed with the reaction products. The Derakane ®411-45 vinyl ester resin contains 45 percent monomeric styrene. Other Derakane ® vinyl ester resins that can be used include: Derakane ®411-C-50 resin containing 50 percent monomeric styrene; Derakane ®470-45 resin containing 45 percent monomeric styrene; and Derakane ®510-A-40 resin, a brominated, vinyl ester resin containing 40 percent monomeric styrene.

A three layer 12 inch by 12 inch laminate is prepared containing 128 grams (g) (30 percent) of glass fibers and 300 g of the above composition cured with 0.9 g of cobalt naphthenate (6 percent), 0.15 g of dimethylaniline and 3 g of methylethylketone peroxide (60 percent). In the above composition, the Derakane ®411-45 contains 45 percent styrene, and the additional 4.25 weight percent styrene is used to dissolve the ceresin wax and Acronal ®4F polybutylacrylate. The styrene loss is measured by the amount of weight loss of the three-ply laminate over the period of time required for complete curing. The above laminate is found to lose 8.1 g of styrene.

After the determination of the styrene loss, another three layers are added to the original laminate. The first three layers of laminate are partially separated from the second three layers of laminate by a strip of Mylar ® film, manufactured by E. I. duPont de Nemours, & Co. Such a strip of Mylar ® facilitates the prying apart of the layers in order to provide a break surface from which the adhesion bond strength may be qualitatively measured. The laminate is allowed to fully cure before it is pryed apart.

The degree of adhesion bond strength between the glass fibers and the resin is judged by the amount of glass fibers present in the break pattern. The test was run on four laminates prepared in the same manner as discussed above. The more glass fibers which are present in the break surface the better the adhesion bond strength of the resin to the glass fibers. Where the break is clean, i.e., where there are very few glass fibers present, the adhesion bond strength is poor. The results are summarized later in Table I.

EXAMPLE 2

A similar three-ply laminate, using 0.1 weight percent ceresin wax and 1.0 weight percent Acronal ®4F is prepared similarly as described hereinabove in Example 1. The styrene loss is measured as discussed in Example 1 and is found to be 7.8 g. The adhesion bond strength between the glass fibers and the resin is judged by the method of Example 1. The results are summarized in Table I.

EXAMPLE 3

A similar three-ply laminate, using 0.1 weight percent ceresin wax and 0.5 weight percent Modaflow ®MF is prepared similarly as described hereinabove in Example 1. The styrene loss is measured as discussed in Example 1 and is found to be 7.8 g. The adhesion bond strength between the glass fibers and the resin is judged by the method of Example 1. The results are summarized in Table I.

EXAMPLE 4

A similar three-ply laminate, using 0.1 weight percent ceresin wax and 1.0 weight percent Modaflow ®MF is prepared similarly as described hereinabove in Example 1. The styrene loss is measured as discussed in Example 1 and is found to be 7.2 g. The adhesion bond strength between the glass fibers and the resin is judged by the method of Example 1. The results are summarized in Table I.

EXAMPLE 5

A similar three-ply laminate, using 0.1 weight percent paraffin wax P58 and 0.5 weight percent Acronal ®4F is prepared similarly as described hereinabove in Example 1. The styrene loss is measured as discussed in Example 1 and is found to be 8.1 g. The adhesion bond strength between the glass fibers and the resin is judged by the method of Example 1. The results are summarized in Table I.

EXAMPLE 6

A similar three-ply laminate, using 0.1 weight percent paraffin wax P58 and 1.0 weight percent Acronal ®4F is prepared similarly as described hereinabove in Example 1. The styrene loss is measured as discussed in Example 1 and is found to be 8.1 g. The adhesion bond strength between the glass fibers and the resin is judged by the method of Example 1. The results are summarized in Table I.

EXAMPLE 7

A similar three-ply laminate, using 0.1 weight percent paraffin wax P58 and 0.5 weight percent Modaflow ®MF is prepared similarly as described hereinabove in Example 1. The styrene loss is measured as discussed in Example 1 and is found to be 8.1 g. The adhesion bond strength between the glass fibers and the resin is judged by the method of Example 1. The results are summarized in Table I.

EXAMPLE 8

A similar three-ply laminate, using 0.1 weight percent paraffin wax P58 and 1.0 weight percent Modaflow ®MF is prepared similarly as described hereinabove in Example 1. The styrene loss is measured as discussed in Example 1 and is found to be 8.4 g. The adhesion bond strength between the glass fibers and the resin is judged by the method of Example 1. The results are summarized in Table I.

EXAMPLE 9

A similar three-ply laminate, using 0.25 weight percent paraffin wax P52 and 1.0 weight percent Acronal ®4F is prepared similarly as described hereinabove in Example 1. The styrene loss is measured as discussed in Example 1 and is found to be 11.1 g. The adhesion bond strength between the glass fibers and the resin is judged by the method of Example 1. The results are summarized in Table I.

EXAMPLE 10

A similar three-ply laminate, using 0.075 weight percent candelilla wax and 1.0 weight percent Acronal ®4F is prepared similarly as described hereinabove in Example 1. The styrene loss is measured as discussed in Example 1 and is found to be 8.7 g. The adhesion bond strength between the glass fibers and the resin is judged by the method of Example 1. The results are summarized in Table I.

EXAMPLE 11

A similar three-ply laminate, using 0.075 weight percent candelilla wax and 1.0 weight percent Modaflow ®MF is prepared similarly as described hereinabove in Example 1. The styrene loss is measured as discussed in Example 1 and is found to be 8.7 g. The adhesion bond strength between the glass fibers and the resin is judged by the method of Example 1. The results are summarized in Table I.

Comparative Examples

EXAMPLE A

A similar three-ply laminate, less the wax and polyacrylate, is prepared similarly as described hereinabove in Example 1. The styrene loss is measured as discussed in Example 1 and is found to be 17.7 g. The results are summarized in Table I.

EXAMPLE B

A similar three-ply laminate, less the polyacrylate, is prepared with 0.1 weight percent ceresin wax similarly as described hereinabove in Example 1. After complete curing another three layers of the instant composition are added to the original laminate as in Example 1. The styrene loss is measured as discussed in Example 1 and is found to be 7.2 g. The adhesion bond strength between the glass fibers and the resin is judged by the method of Example 1. The results are summarized in Table I.

EXAMPLE C

A similar three-ply laminate, less the polyacrylate, is prepared with 0.1 weight percent paraffin wax P58 similarly as described hereinabove in Example 1. After complete curing, another three layers of the instant composition are added to the original laminate as in Example 1. The styrene loss is measured as discussed in Example 1 and is found to be 6.9 g. The adhesion bond strength between the glass fibers and the resin is judged by the method of Example 1. The results are summarized in Table I.

EXAMPLE D

A similar three-ply laminate, less the polyacrylate, is prepared with 0.25 weight percent paraffin wax P52 similarly as described hereinabove in Example 1. After complete curing, another three layers of the instant composition are added to the original laminate as in Example 1. The styrene loss is measured as discussed in Example 1 and is found to be 9.3 g. The adhesion bond strength between the glass fibers and the resin is judged by the method of Example 1. The results are summarized in Table I.

EXAMPLE E

A similar three-ply laminate, less the polyacrylate, is prepared with 0.075 weight percent candelilla wax similarly as described hereinabove in Example 1. After complete curing, another three layers of the instant composition are added to the original laminate as in Example 1. The styrene loss is measured as discussed in Example 1 and is found to be 6.3 g. The adhesion bond strength between the glass fibers and the resin is judged by the method of Example 1. The results are summarized in Table I.

TABLE I

| Example | Additives (Weight Percent) | Peel Adhesion Rating | Styrene Loss (Grams) |
|---|---|---|---|
| A | None | Excellent | 17.7 |
| B | Cerasin wax (0.1) | Poor-to-Fair | 7.2 |
| 1 | Cerasin wax (0.1) Acronal ® 4F (0.5) | Good-to-Excellent | 8.1 |
| 2 | Cerasin wax (0.1) Acronal ® 4F (1.0) | Good-to-Excellent | 7.8 |
| 3 | Cerasin wax (0.1) Modaflow ® MF (0.5) | Good-to-Excellent | 7.8 |
| 4 | Cerasin wax (0.1) Modaflow ® MF (1.0) | Good-to-Excellent | 7.2 |
| C | Paraffin wax P58 (0.1) | Very Poor | 6.9 |
| 5 | Paraffin wax P58 (0.1) Acronal ® 4F (0.5) | Good-to-Excellent | 8.1 |
| 6 | Paraffin wax P58 (0.1) Acronal 4F (1.0) | Good-to-Excellent | 8.1 |
| 7 | Paraffin wax P58 (0.1) Modaflow ® MF (0.5) | Good | 8.1 |
| 8 | Paraffin wax P58 (0.1) Modaflow ® MF (1.0) | Excellent | 8.4 |
| D | Paraffin wax P52 (0.25) | Poor-to-Fair | 9.3 |
| 9 | Paraffin wax P52 (0.25) Acronal ® 4F (1.0) | Excellent | 11.1 |
| E | Candelilla wax (0.075) | Very poor | 6.3 |
| 10 | Candelilla wax (0.075) Acronal ® 4F (1.0) | Fair | 8.7 |
| 11 | Candelilla wax (0.075) Modaflow ® MF (1.0) | Poor | 8.7 |

The results indicate Applicants' VER composition exhibits low styrene emission and excellent adhesion bond strength between the VER composition and the glass fibers. The addition of the polyacrylate improves the adhesion bond strength between the VER composition and the glass fibers, while effectively maintaining low styrene emission for the VER composition.

What is claimed is:

1. An improved, low styrene emission, VER composition containing: (1) a VER which is an esterification product of a polyepoxide and a monounsaturated monocarboxylic acid; (2) styrene as a reactive diluent; (3) a wax as a styrene emission inhibitor; and (4) wherein the improvement comprises including in such composition a polyacrylate wherein said polyacrylate is present in an amount sufficient to increase the adhesion characteristic of the VER composition with a reinforcing material used therewith.

2. The VER composition of claim 1 wherein the said polyacrylate is a polymer of an alkyl ester of acrylic acid.

3. The VER composition of claim 2 wherein the said polymer of an alkyl ester of acrylic acid is polybutylacrylate.

4. The VER composition of claim 2 wherein the said polymer of an alkyl ester of acrylic acid is a copolymer of polyethylacrylate and polyethylhexylacrylate.

5. The VER composition of claim 2 wherein the said polyacrylate is about 0.1 to about 5 weight percent of the said VER composition.

6. The VER composition of claim 2 wherein the said polyacrylate is about 0.25 to about 1 weight percent of the said VER composition.

7. The VER composition of claim 1 wherein the said reinforcing material is glass fibers.

8. The VER composition of claim 1 wherein the said wax is about 0.05 to about 5.0 weight percent of the said VER composition.

9. The VER composition of claim 1 wherein the said wax is about 0.10 to about 0.5 weight percent of the said VER composition.

10. The VER composition of claim 1 wherein the said wax is a ceresin wax.

11. The VER composition of claim 1 wherein the said wax is a paraffin wax P58 which has a melting point of approximately 58° C.

12. The VER composition of claim 1 wherein the said wax is a paraffin wax P52 which has a melting point of approximately 52° C.

* * * * *